UNITED STATES PATENT OFFICE.

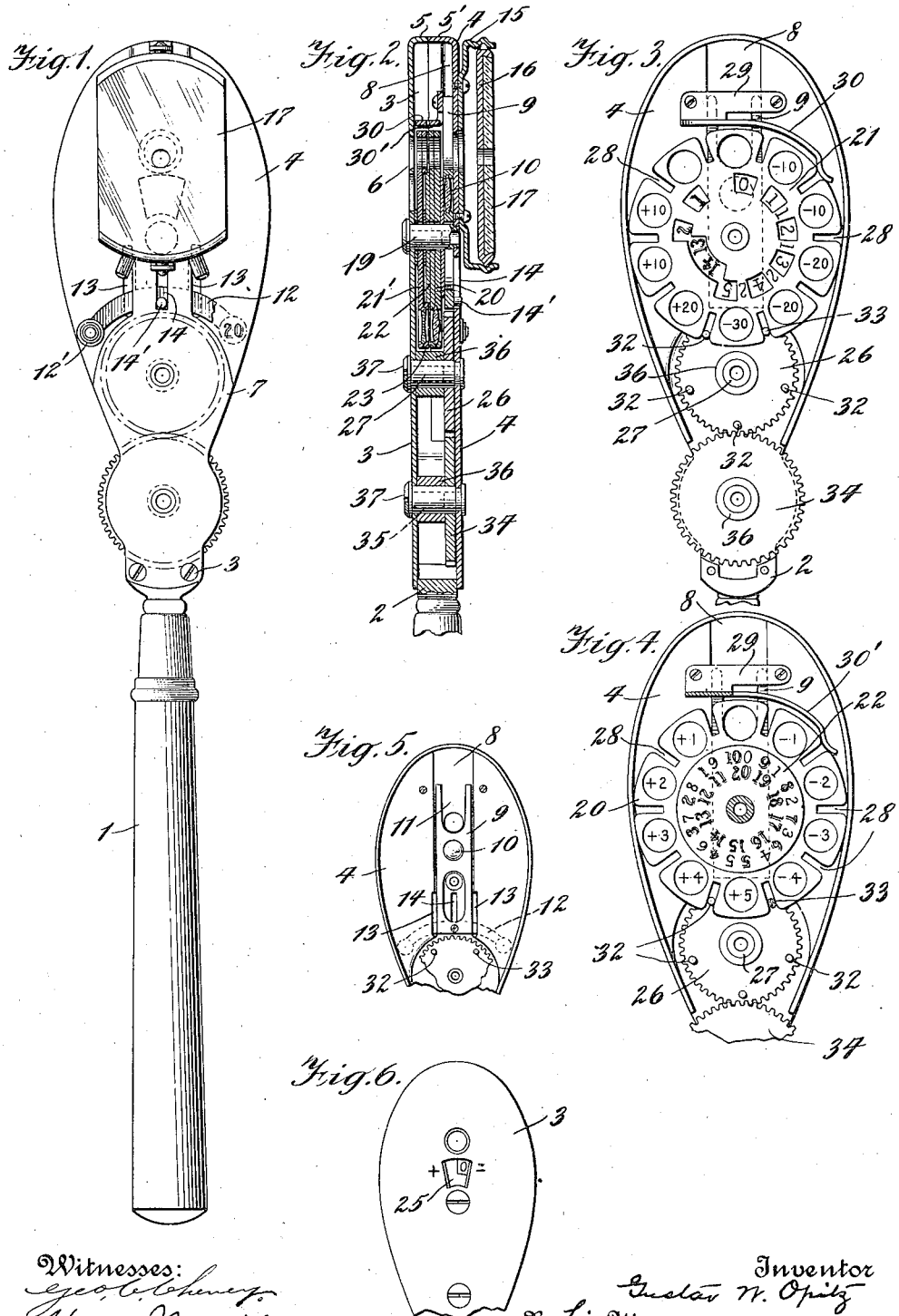

GUSTAV W. OPITZ, OF NEW YORK, N. Y., ASSIGNOR TO GENERAL OPTICAL COMPANY, INC., A CORPORATION OF NEW YORK.

OPHTHALMOSCOPE.

1,172,827.   Specification of Letters Patent.   Patented Feb. 22, 1916.

Application filed November 17, 1913. Serial No. 801,371.

*To all whom it may concern:*

Be it known that I, GUSTAV W. OPITZ, a citizen of the United States, residing at the city of New York, in the borough of Manhattan and State of New York, have invented certain new and useful Improvements in Ophthalmoscopes, of which the following is a full, clear, and exact description.

This invention relates to ophthalmoscopes and more particularly to ophthalmoscopes of the multiple lens type.

One object of my invention is to provide an improved ophthalmoscope of this type in which the lens carries and other movable parts shall be arranged in compact form within a casing of a suitable size and shape to conform to the face of the operator.

Another object of my invention is to provide means for positively rotating two disk lens carriers in a determined relation to each other, whereby lenses arranged around the periphery of the carriers will always appear in exact alinement with the sight apertures in the casing and with each other, thus furnishing means for conveniently bringing lenses of the proper power before the sight apertures to obtain the proper focus on the eye of the patient.

Still another object of my invention is to provide lenses of determined powers arranged in a definite order around the periphery of the carrier whereby upon a rotation of the carriers in a determined relation to each other, lenses will appear before the sight apertures in the casing, whose powers will vary in a determined order.

Still another object of my invention is to provide means for mounting a preliminary test lens so that it may readily be manipulated by the operator, while the instrument is held in either hand.

With these and other objects in view, my invention consists of the constructions and combinations which will hereafter be set out in the specification and particularly pointed out in the claims.

In the drawings: Figure 1 is an elevation of an ophthalmoscope embodying my invention and showing a handle attached thereto; Fig. 2 is a central vertical section of Fig. 1; Fig. 3 is an elevation with the front portion of the casing removed showing the lens carrier and associated parts; Fig. 4 is a view similar to Fig. 3 with a front or outer lens carrier removed; Fig. 5 is a detail view showing the slide for carrying the preliminary test lens; Fig. 6 is a detail view of the front face of the ophthalmoscope showing the opening before which the numerals appear for recording the power of the lenses and also showing the exact actual size of the instrument.

A handle 1 is provided with a threaded socket into which is screwed a stem of a block 2. Fastened to this block preferably by screws 3', are two substantially elliptically-shaped plates 3 and 4 having flanges 5 and 5' respectively, the edges of which abut each other to form a casing which incloses the lens carriers and the mechanism for rotating the same, which will be hereafter referred to. In the upper portion of the plates 3 and 4, *i. e.*, at a point where the casing has commenced to narrow, are sight apertures 6, through which the operator looks in examining the eye of the patient. By making the casing of the ophthalmoscope substantially elliptical in contour and inclosing the lens carriers and other movable parts therein, it is evident that this shape of casing is especially adapted to fit the contour of a face of a person, for since the eye is on a level with the sight apertures 6, the lower narrow portion of the casing will be substantially on the level with the widest portion of the nose and thus permit the ophthalmoscope to be used to advantage in a vertical position.

The plate 4 which constitutes the rear face of the casing is preferably stamped to form a raised boss and a raised medial longitudinal portion 8, which extends from the boss 7 to the top of the plate. Arranged within the casing and in the groove afforded by the raised portion 8, is a slide 9 which carries a convex lens 10 whose power is +20 D, this lens being used in obtaining a preliminary focus on the eye of the patient, in a manner common with this type of ophthalmoscope. The free end of the slide 9 is recessed or slotted at 11 to prevent the obscuring of the sight apertures 6 when the lens 10 has been moved out of alinement therewith. Fastened to the lower end of the slide 9, is a two-arm lever 12 which passes through slots 13 in the plate 4 to the exterior of the casing. A screw or pin 14' which fastens this lever to the slide extends through an elongated slot 14 cut in the raised portion 8 and serves to properly guide the slide 9 in its movement. Arranged at each extremity of the two-arm lever 12, are knurled knobs 12' which are located adjacent to the lateral walls of the casing, so that the slide may be readily moved by the fingers of either the right or left hand, depending upon the eye with which the instrument is being used. The numeral 20 is printed on the casing adjacent one of the knobs 12' to denote that the power of the lens within the slide 9 is +20 D.

Fastened to the raised portion 8 of the plate 4 is a bracket 15, having ears provided with indentations in which the trunnion bearings carried by a plate 16, rests. The plate 16 is provided with arc-shaped flanges which secures a mirror 17 to the plate, the mirror and plate being provided with the usual sight openings in alinement with the sight apertures 6. A hollow stub shaft 19 is firmly secured to a circular opening in the plate 4 which shaft supports two independently rotatable lens carriers 20 and 21 of a size to substantially fill the middle portion of the casing.

The carrier 20 comprises two circular plates, each plate having ten circular openings therein arranged equi-distantly around its periphery. These openings are counterbored and the plates fastened together with the edges of the counterbored portion abutting each other, thus forming annular recesses in which the peripheral edges of the lenses rest to firmly hold them in place between the plates. Lenses whose powers are −1 D, −2 D, −3 D, −4 D, +5 D, +4 D, +3 D, +2 D, and +1 D, are arranged in nine of these circular openings and in the order shown in Fig. 4, the tenth opening being left blank. Fastened to the lens carrier 20 is a disk 22, which has three sets or series of numerals printed or stamped thereon. As shown in Fig. 4, the numerals in two of the sets or series are shown in heavier characters than the third series, the heavy numerals denoting lenses of plus powers, while the light numerals denote the minus powers. However, in the actual construction of the instrument, it is preferable to print the numerals in different colors, for example, using white to denote the plus powers and red for the minus powers. One numeral of each of these series is arranged opposite a certain one of the lenses, as for example, the numerals 10, 0 and 20 are arranged opposite the blank opening; 9, 1 and 19 opposite the −1 D lens and so on, as will be clear from Fig. 4. It will also be noted that the numerals in the series denoting lenses of minus powers run from 1 to 10 and from 11 to 20, in a counter clockwise direction, while the series denoting lenses of the plus powers run from 1 to 0 in a clockwise direction, the purpose of this particular arrangement being hereinafter set forth.

The lens carrier 21 comprises a single circular plate 21', to which is secured an annular ring 23, the inner diameter of which is sufficient to permit the disk 22 to nest within it when the two carriers are in position on the shaft 19, thus permitting the lenses in the carriers to be in close proximity to each other.

Thin washers are preferably interposed between the two carriers 20 and 21 and between the carriers and casing, to prevent frictional contact between the parts. The lens carrier 21 which is of the same size as carrier 20, is provided with ten circular openings arranged equidistantly around its periphery of the same size as the openings in the lens carrier 20. Arranged within these openings are lenses whose powers are −10 D, −10 D, −20 D, −20 D, −30 D, +20 D, +10 D and +10 D, the other two openings remaining blank.

The plate 21' is provided with a plurality of spaced openings of different sizes through which certain of the numerals on the disk 22 are visible, and appear before an opening 25 provided in the plate 3 (see Fig. 6).

Intermediate the openings in the plate 21' are ribs, the numeral one being stamped or printed on the ribs opposite the second of the −10 D lenses and the first of the −20 D lenses and the numeral two on the ribs opposite the second of the −20 D lenses and the −30 D lenses which numerals denote lenses of minus powers and are arranged to be combined with the numerals on the disk 22, which denote lenses of the minus powers to form numerals ranging from −11 to −29 which numerals appear before the opening 25. The order in which the above described numerals appear before the opening 25 being clear from the operation which will be later set out.

The two lens carriers 20 and 21 are rotated in a predetermined relation to each other by means of a pinion 26 rotatably mounted on a hollow shaft 27 secured to the plate 4. Each of the lens carriers 20 and 21 have ten elongated radially disposed slots 28 arranged between the lenses and spaced equidistantly around their peripheries. The corners of the walls of the slots are rounded, forming depressions or shallow notches. Mounted on the plate 4 of the casing is a plate 29 carrying two offset blades 30 and 30', whose free ends are curved to fit in the shallow depressions formed in the peripheries of the lens carriers 20 and 21 to positively position the lenses carried thereby in alinement with the sight apertures 6 and to prevent inadvertent movement of the carriers when they are not being positively rotated. The pinion 26 has projecting therefrom five pins, four of which pins are designated 32, being of a length to engage only in the slots 28 of the carrier 20, while the fifth pin 33 engages in the slots of both carriers to simultaneously effect a partial rotation of both carriers. The pinion 26 is rotated by means of a pinion 34 mounted on a hollow shaft 35 secured to the plate 4, a portion of its periphery projecting through slots cut in the lateral wall of the casing whereby the pinion may be manually rotated. Sleeves or spacing blocks 36 are placed over the shafts 27 and 35 which sleeves hold the pinions 26 and 34 in place when the plate 3 is screwed tight against the ends of the hollow shafts 19, 27 and 35 by means of screws 37 which screws also hold the plates 3 and 4 of the casing firmly secured together.

The mode of operation: The operator places the instrument to his eye to examine the eye of the patient. As the movable parts are entirely inclosed in an elliptical casing, the instrument is especially adapted to be conveniently used as has been stated. The preliminary test lense of +20 D carried by the slide 9 may be readily manipulated by either hand of the operator, depending upon whether he is using the instrument with his left or right eye. After the preliminary test has been made, the pinion 34 may be manually rotated to bring the lens of the proper power in alinement with the sight aperture 6 to obtain the proper focus on the eye and so determine its visional power.

Assuming that the pinion 34 is rotated in a direction to intermittently rotate the lens carriers 20 and 21 in a counter clockwise direction. As shown in Figs. 3 and 4, both of the lens carriers are in their 0 position, i. e., with blank openings in alinement with the sight apertures 6. The numeral 0 will appear before the opening 25, the plate 21' covering the numerals 10 and 20, denoting the plus powers. For the first four partial rotations of the carrier 20, lenses whose powers are −1 D, −2 D, −3 D, and −4 D will be brought into alinement with the sight apertures 6 and the numerals 1 to 4 denoting minus powers will successively appear before the opening 25 in the casing, the disk 22 covering the other numerals opposite these respective lenses.

On the fifth partial rotation of the carrier 20, the lens carrier 21 will be simultaneously moved therewith due to the engagement of the pin 33 in the slots of both carriers. This will bring the −10 D lens of the carrier 21 and the +5 D lens of the carrier 20 into alinement with the sight apertures 6. The power of the combined lenses will therefore be +5 D + −10 D = −5 D and the numeral 5 denoting a lens of this minus power will appear before the opening 25. In the same way upon the eleventh partial rotation of the carrier 20, the −1 D lens and the second of the −10 D lens will be brought into alinement with the sight apertures, the power of the combined lenses being −1 D + −10 D = −11 D. The numeral 1 on the carriers 20 and 21 will then both appear side by side in front of the opening 25 thus properly recording the power of the lenses. Likewise if the lens carrier 20 is given 33 partial rotations the lens carrier 21 will have received six. This will bring the −3 D lens in the lens carrier 20 and the +20 D lens in the carrier 21 into alinement with the sight apertures 6, the combined powers of the lenses being +17 D and the numeral 17 will appear before the opening 25. It will therefore be seen that by rotating the pinion 35 in one direction, lenses whose powers range from 0 to −29 D and from +20 D to 0 will appear before the sight apertures 6 in the order named, it being understood that when the operator obtains the proper focus he will stop rotating the lens and record the power of the lenses in alinement with the sight apertures 6 from which he can determine the defects in the visional power of the eye of the patient.

Having described my invention, I claim:

1. In an instrument of the class described, two lens carriers mounted on a common axis, each carrier comprising a disk having a plurality of lenses arranged around its periphery and a plurality of slots cut in the periphery thereof, a rotatable member having pins projecting therefrom for engaging in the slots of one of said carriers and a pin carried by the said member for simultaneously engaging in the slots of both of said carriers.

2. In an instrument of the class described, a substantially elongated elliptically-shaped casing having a handle attached thereto at one end and sight openings in the faces of said casing adjacent the other end thereof, disk lens carriers mounted upon a common axis in the middle portion of said casing and entirely inclosed thereby, said carriers having lenses arranged around their peripheries adapted to be brought into alinement with the sight openings upon the rotation of the carriers, and gearing for intermittently rotating said carriers in a predetermined relation to each other, comprising a rotatable member having a portion of its periphery extending exteriorly of the casing for manual manipulation at a point adjacent the point of attachment of the handle to the casing.

3. In an instrument of the class described, two substantially elongated elliptically shaped plates having bent over flanges abutting each other to form a thin flat casing, having a handle attached thereto at its lower end, said casing having sight apertures in the upper narrow portions of the faces of said casing, a plurality of disk lens carriers mounted on a common axis in the middle portion of said casing and entirely inclosed therein, said carrier having lenses arranged thereon adapted to be brought into alinement with said sight apertures, and gearing comprising a rotatable member in the narrow portion of said casing adjacent the handle having a portion thereof extending exteriorly of the casing for rotating said carriers in a determined relation to each other.

4. In an instrument of the class described, a substantially elongated elliptically shaped casing having a handle attached thereto at its lower end, said casing having sight apertures in the upper narrow portions of the faces thereof, a plurality of disk lens carriers mounted on a common axis in the middle portion of said casing and entirely inclosed therein, said carrier having lenses arranged thereon adapted to be brought into alinement with said sight apertures, and gearing comprising a rotatable member in the narrow portion of said casing adjacent the handle for rotating said carriers in a determined relation to each other, said casing having an extension with slots in the walls thereof, and a gear wheel in said casing for rotating said rotatable member, said gear wheel having a portion of its periphery projecting through said slots for manual manipulation.

5. In an instrument of the class described, two lens carriers mounted on a common axis, one of said carriers having a blank opening and lenses whose powers range from $+1$ D to $+5$ D, and from $-1$ D to $-4$ D arranged consecutively around its periphery in the order named, the other of said carriers having two blank openings and lenses whose powers range from $-10$ D to $-30$ D and from $+10$ D to $+20$ D arranged consecutively around its periphery in the order named, the blank opening in one carrier alining with the first of the two blank openings in the other carrier when the carriers are in initial position and means for imparting to each of said carriers a step by step movement in which the first named carrier is advanced five steps to each step of the second named carrier, whereby said lenses are successively brought into alinement to produce lenses whose powers range from 0 to $-29$ D and from $+20$ D to 0, in the order named, or vice versa.

6. In an instrument of the class described, a casing having a sight aperture and a groove formed in one of the walls thereof, a slide in said groove carrying a lens, and means for moving said slide to bring said lens into alinement with said sight aperture, said means comprising a two arm lever fastened to said slide and having at least portions thereof exterior of the casing and in close proximity to the side edges of the face of the casing.

7. In an instrument of the class described, a casing having a sight aperture, a groove formed in one of the walls thereof, a slide in said groove carrying a lens and means for moving said slide to bring the lens into alinement with said sight aperture.

8. In an instrument of the class described, a casing having a sight aperture and an opening therein, lens carriers in said casing mounted on a common axis, each of said carriers comprising a disk having a plurality of lenses arranged around its periphery, numerals on one of said disks arranged in sets in radial alinement with each of said lenses, the numerals of at least some of said sets being unequally spaced from the center of the disk, openings in the other of said disk arranged in substantially circular form opposite the numerals on the other of said disk, some of which openings are spaced unequally from the center of the carrier, numerals on the ribs between some of said openings, said numerals and openings being spaced to appear before said opening in said casing in different relations in which one numeral of the set on the first of said disk is exposed through a corresponding opening in the other disk, which numeral may or may not be combined with one of the numerals on the ribs between said openings on the other of said disks upon a step by step movement being imparted to said disks and means for imparting such movement to said disks.

In witness whereof, I subscribe my signature, in the presence of two witnesses.

GUSTAV W. OPITZ.

Witnesses:
FRED. H. KORPF,
FREDERICK L. HIGGINS.